(12) United States Patent
Srikantam et al.

(10) Patent No.: US 6,822,481 B1
(45) Date of Patent: Nov. 23, 2004

(54) METHOD AND APPARATUS FOR CLOCK GATING CLOCK TREES TO REDUCE POWER DISSIPATION

(75) Inventors: Vamsi K. Srikantam, Sunnyvale, CA (US); Airell Richard Clark, II, Albany, OR (US)

(73) Assignee: Agilent Technologies, Inc., Palo Alto, CA (US)

( * ) Notice: Subject to any disclaimer, the term of this patent is extended or adjusted under 35 U.S.C. 154(b) by 32 days.

(21) Appl. No.: 10/461,531

(22) Filed: Jun. 12, 2003

(51) Int. Cl.[7] .............................................. H03K 19/00
(52) U.S. Cl. .............................. 326/93; 326/94; 326/95
(58) Field of Search ...................................... 326/93–98

(56) References Cited

U.S. PATENT DOCUMENTS

| | | | |
|---|---|---|---|
| 5,923,188 A | * | 7/1999 | Kametani et al. ............. 326/93 |
| RE36,839 E | | 8/2000 | Simmons et al. ............. 326/93 |
| 6,204,695 B1 | * | 3/2001 | Alfke et al. .................. 326/93 |
| 6,232,820 B1 | | 5/2001 | Long et al. .................. 327/374 |
| 6,247,134 B1 | | 6/2001 | Sproch et al. ............... 713/320 |
| 6,272,667 B1 | | 8/2001 | Minami et al. ................. 716/6 |
| 6,434,704 B1 | | 8/2002 | Dean et al. .................. 713/320 |

* cited by examiner

*Primary Examiner*—Anh Q. Tran (57) ABSTRACT

A clock gating circuit reduces the power dissipation in a digital circuit including at least one functional block by gating the clock signal at an input to a clock tree feeding the functional block. The clock gating circuit includes a logic gate that receives a clock signal and a clock disable signal generated by the functional block, and gates the clock signal at the input to the clock tree feeding the functional block. Further, a global signal generator is provided to transmit a global signal to each of the functional blocks to prevent the generation of clock disable signals, when necessary, such as during testing of chips.

21 Claims, 7 Drawing Sheets

METHOD AND APPARATUS FOR CLOCK GATING CLOCK TREES TO REDUCE POWER DISSIPATION

BACKGROUND OF THE INVENTION

1. Technical Field of the Invention

The present invention relates generally to clock gating circuits, and in particular to methods for gating clock distribution networks within digital circuits.

2. Description of Related Art

Digital circuits have widespread applications in the computing industry. Recently, the demand for mobile computing devices, such as personal digital assistants (PDAs), cellular telephones and laptop computers, has increased significantly. Mobile computing devices typically rely on batteries for power, and therefore, a key specification for such devices is low power consumption. In addition to increasing the battery life, reducing the power consumption in mobile computing devices also reduces the amount of heat generated, which enables smaller computing devices to be produced with diminished cooling requirements.

Significant power savings in such mobile computing devices can be obtained by reducing the amount of switching activity in the digital circuitry. In most digital circuit designs, the clock distribution network or "tree" includes a large number of switching elements to distribute the clock signal to all functional blocks (e.g., logic components) of the circuit with minimal clock skew. To reduce the power consumption of the clock distribution network, various "clock gating" methods have been utilized to prevent functional blocks from receiving a clock signal while in an idle state.

For example, U.S. Reissue Pat. No. Re. 36,839 to Simmons et al. and U.S. Pat. No. 6,232,820 to Long et al., each of which is hereby incorporated by reference, both describe conventional clock-gating circuits that enable and disable the clock signal to functional blocks in a digital circuit. However, neither Simmons et al. nor Long et al. address the power dissipation resulting from the switching elements within the clock tree feeding the functional blocks. Thus, conventional clock-gating circuits do not sufficiently reduce the power consumption in digital circuits.

Other efforts at improving the clock tree efficiency with gated clocks also have not adequately or effectively reduced the power consumption in traditional digital circuits. For example, U.S. Pat. No. 6,272,667 to Minami et al., which is hereby incorporated by reference, proposes a CAD tool to insert and optimize the buffer cells that are placed after the clock-gating enable signal is generated. As another example, U.S. Pat. No. 6,434,704 to Dean et al., which is hereby incorporated by reference, describes an algorithm to separate the gated and ungated clock tree, while also minimizing the clock skew. Both Minami et al. and Dean et al. present complicated circuit design techniques that are not easily implemented into existing digital circuits. Therefore, neither Mianami et al. nor Dean et al. provide a suitable solution for reducing power consumption requirements in traditional digital circuits. Thus, what is needed is a clock gating system for gating the clock tree to individual functional blocks of a digital circuit.

SUMMARY OF THE INVENTION

Embodiments of the present invention provide a clock gating circuit for use in a digital circuit having at least one functional block. The clock gating circuit gates the clock signal at an input to a clock tree feeding the functional block. The clock gating circuit includes a logic gate that receives both a clock signal and a clock disable signal generated by the functional block. Based on the value of the clock disable signal, the logic gate gates the clock signal to the functional block.

In one embodiment, the functional block generates the clock disable signal while in an idle state. The functional block determines whether the next operating state is an idle state based upon the current state and the value of the input signals to the functional block. Each functional block includes combinational logic and one or more clocked external flip-flops. The clock disable signal gates the clock signal to the external flip-flops to prevent switching of the external flip-flops. In addition, the clock disable signal gates the clock signal to any internal flip-flops within the functional block to further reduce power consumption in the digital circuit.

In further embodiments, the digital circuit is a pipeline circuit having multiple functional blocks interconnected in a pipeline design. Each functional block generates a respective clock disable signal to gate the clock signal to each functional block independently of other functional blocks within the pipeline. Additional embodiments include a global signal generator for providing a global signal to each of the functional blocks to prevent the generation of clock disable signals, when necessary, such as during testing of chips.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1A:
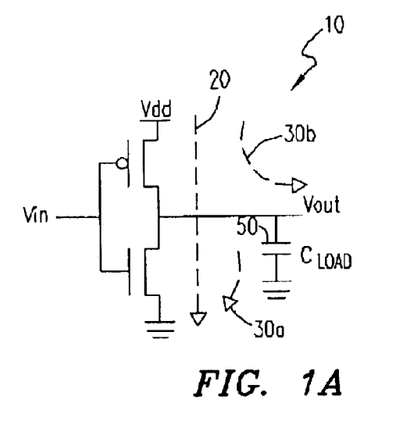
FIGS. 1A and 1B are circuit schematics illustrating exemplary power dissipation components in a digital circuit.

Power consumption in digital circuits can be classified as either dynamic power consumption or static power consumption. Dynamic power consumption is the dominant power consumption component and is a result of the capacitive nodes within a digital circuit switching. For example, referring to FIG. 1A, a CMOS digital circuit 10 having a capacitive node 50 is illustrated. The dynamic power dissipation in the circuit 10 is a function of the capacitive charging switching current 30b, the capacitive discharging switching current 30a and the direct path current 20 between Vdd and ground during switching. The capacitive charging switching current 30b, the capacitive discharging switching current 30a and the direct path current 20 combined contribute to the dynamic power dissipation. If S denotes the switching activity, $C_{LOAD}$ is the capacitance of the output node and Vdd is the power supply, then the dynamic power dissipation due to the capacitive charging and discharging currents is given by:

$$DPD = \frac{1}{2} * Vdd^2 * C_{LOAD} * f, \qquad \text{(Equation 1)}$$

where f is the frequency of operation of the digital circuit.

Figure 1B:
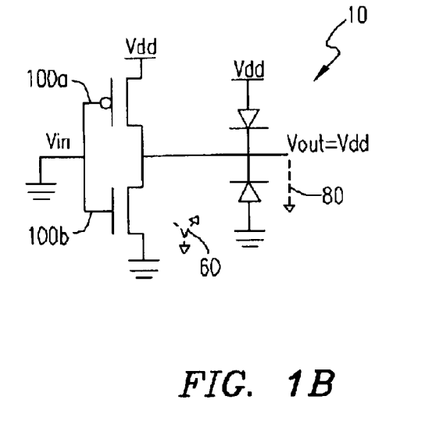

On the other hand, static power consumption is a result of the inherent leakage current of the transistors within the digital circuit, and therefore, insignificant in comparison to the dynamic power consumption. For example, referring to FIG. 1B, since the transistors 100a and 100b in a CMOS digital circuit 10 are in series, the static power dissipation is a function of the leakage current 80 and the subthreshold current 60 in the off transistor 100a or 100b. The leakage current 80 and subthreshold current 60 combined are several orders of magnitude smaller than the capacitive charging and discharging currents, and therefore, the total static power consumption in CMOS digital circuits is smaller than the dynamic power consumption.

Figure 2:
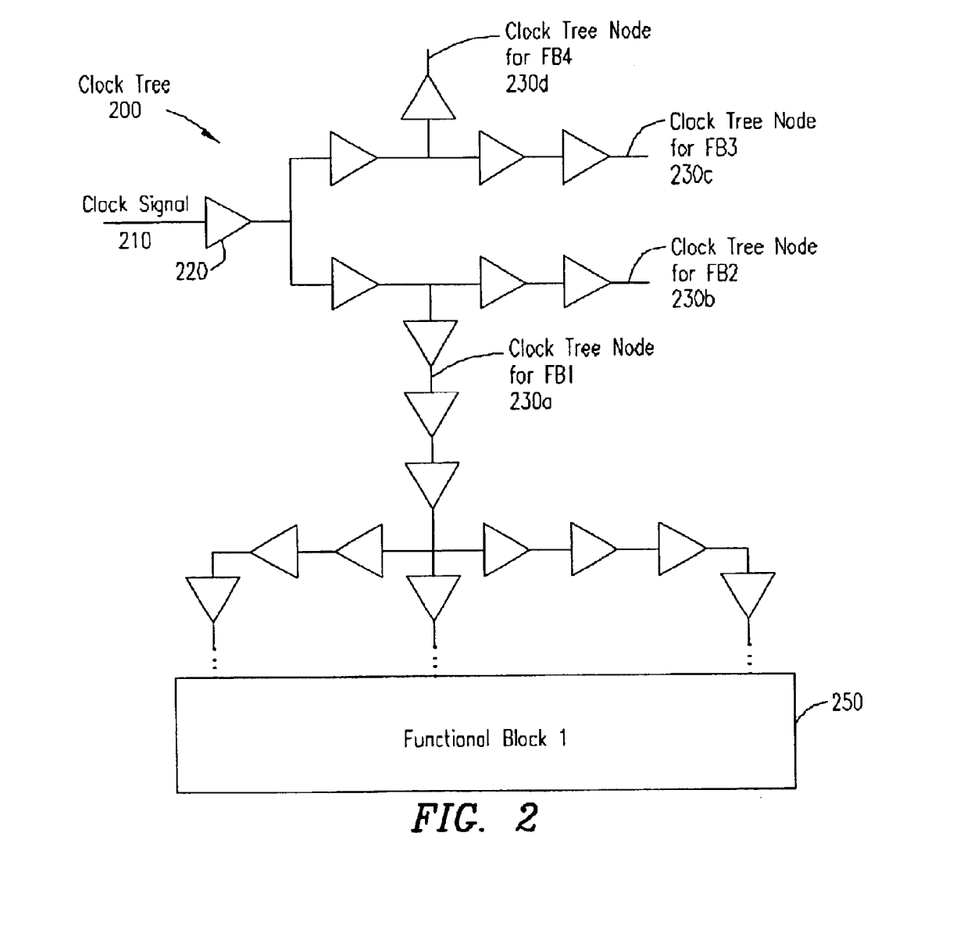
FIG. 2 is a circuit diagram of an exemplary clock tree for minimizing clock skew in a clock signal delivered to multiple functional blocks.

Therefore, the most significant power savings can be achieved by reducing the dynamic power dissipation, and this can be accomplished by reducing the amount of switching activity within digital circuits. As discussed above, the clock tree within many digital circuit designs includes a large number of various types of switching elements. One example of a clock tree switching element is shown in FIG. 2, which illustrates an exemplary clock tree 200 for providing a clock signal 210 to multiple functional blocks 250. The clock tree 200 includes a clock source (not shown), e.g., a crystal oscillator, for generating a clock signal 210 and a plurality of delay elements 220 (or buffers) coupled to receive the clock signal and distribute the clock signal 210 to the functional blocks 250. Each delay element 220 includes a switching element to control the timing of the clock signal 210 delivered to each of the functional blocks 250 in order to minimize the clock skew in the clock tree 200.

The clock tree 200 further includes a number of branches, each beginning at a node of the clock tree 200 e.g., nodes 230a, 230b, 230c and 230d. Each node 230a, 230b, 230c, 230d is shown feeding the clock signal 210 to a particular functional block 250. At least one delay element 220 is coupled between each clock tree node 230a, 230b, 230c and 230d and a respective functional block 250 to minimize the clock skew between the clock signals 210 provided to each of the functional blocks 250.

Figure 3:
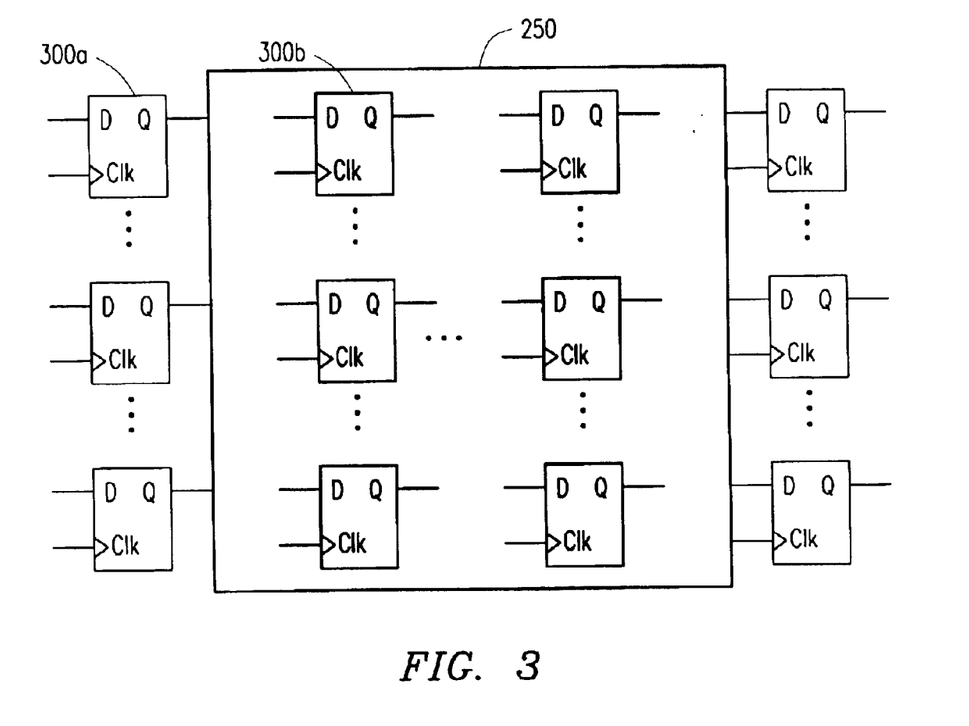
FIG. 3 illustrates an exemplary functional block having multiple internal and external flip-flops for clocking logic components of the functional block.

Another example of a clock tree switching element is shown in FIG. 3. Each functional block 250 includes combinational logic including one or more logic components (not shown). Depending on the number of logic components and the timing requirements of the logic components, multiple clocked flip-flops to each functional block 250 may be necessary to meet performance requirements of the digital circuit. For example, as shown in FIG. 3, a functional block 250 can have one or more external flip-flops 300a connected to the functional block 250 and one or more internal flip-flops 300b within the functional block 250 to control the timing of the clock signals to the different logic components of the functional block. Each of the flip-flops controls the timing of the clock signal 210 delivered to each of the functional blocks 250 and each of the logic components within the functional blocks 250. In addition, each of the flip-flops contributes to the dynamic power dissipation in the digital circuit.

Conventional clock gating techniques that individually gate the clock 210 to each external flip-flop 300a require significant circuitry (e.g., OR-gates immediately prior to each individual external flip-flop 300a). In addition, because the internal flip-flops 300b are clocked along with the external flip-flops 300a, gating the external flip-flops 300a without gating the internal flip-flops 300b results in power dissipation within the functional blocks 250 because the internal flip-flops 300b continue to be switched during idle periods. Furthermore, clock gating immediately prior to the flip-flops 300a or 300b does not reduce the power dissipation resulting from the switching in the delay elements of the clock tree.

Figure 4:
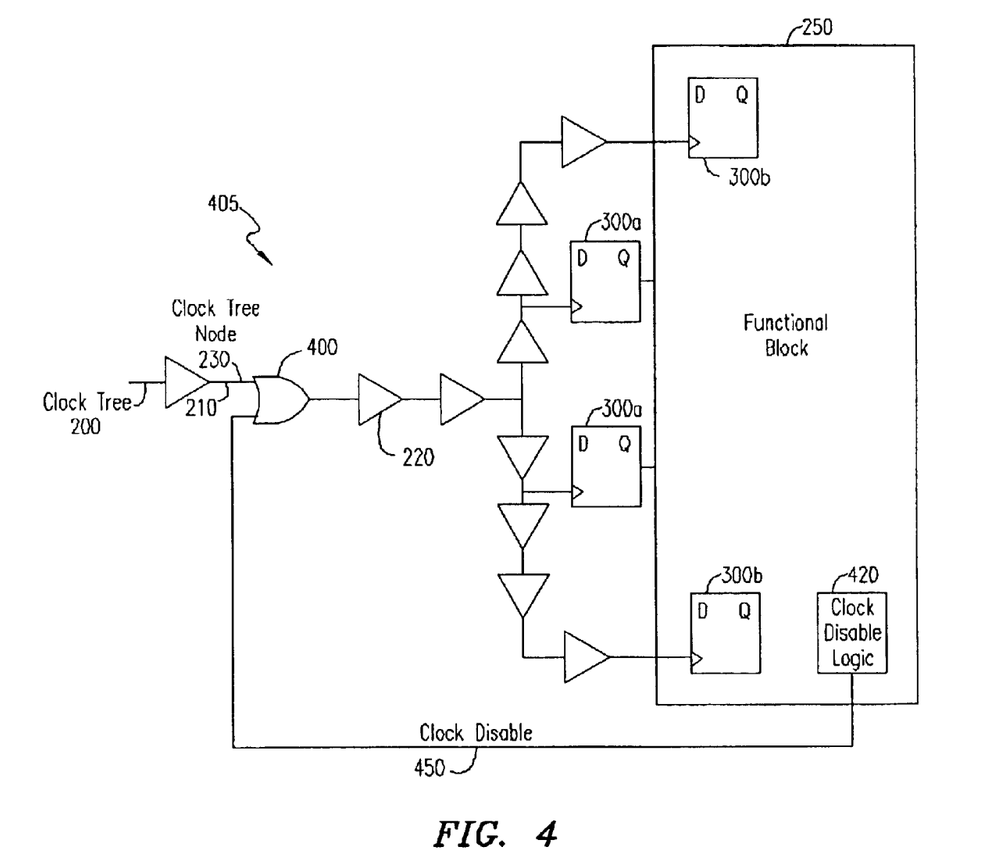
FIG. 4 is a circuit diagram illustrating an exemplary clock gating circuit for gating a clock signal to a functional block at an input to a clock tree feeding the functional block, in accordance with embodiments of the invention.

Therefore, in accordance with embodiments of the invention, FIG. 4 illustrates an exemplary clock gating circuit 405 for gating a clock signal 210 to a functional block 250 at a node 230 of the clock tree 200 corresponding to the functional block 250. Each functional block 250 includes clock disable logic 420 for generating a clock disable signal 450 that indicates the functional block 250 is in an idle state and does not need to be clocked. As an example, the clock disable logic 420 can be implemented using a flip-flop. A logic gate 400 (e.g., an OR gate or AND gate) receives the clock signal 210 from the clock tree 200 and the clock disable signal 450 from the functional block 250. Based on the logic state of the clock disable signal 450, the logic gate 400 gates the clock signal 210 to the clock tree delay elements 220 feeding the functional block 250. In turn, the clock signal 210 is gated to all external flip-flops 300a connected to the functional block 250 and all internal flip-flops 300b within the functional block 250. Thus, the entire functional block 250 is clock-gated and the portion of the clock tree 200 feeding the functional block 250 is clock-gated, thereby maximizing power dissipation reduction while the functional block 250 is in an idle state.

Each functional block 250 dynamically determines when an idle state exists that is sufficient to justify disabling the clock signal 210 at the clock tree input 230 to the functional block 250. For example, a threshold number of idle clock cycles may be required before the clock signal 210 is gated.

The generation of the clock disable signal 450 and the gating of the clock signal 210 both consume power, and therefore, the reduction in power dissipation produced from gating the clock signal 210 to the functional block 250 should exceed the power dissipation from the gating process itself.

Figure 8:
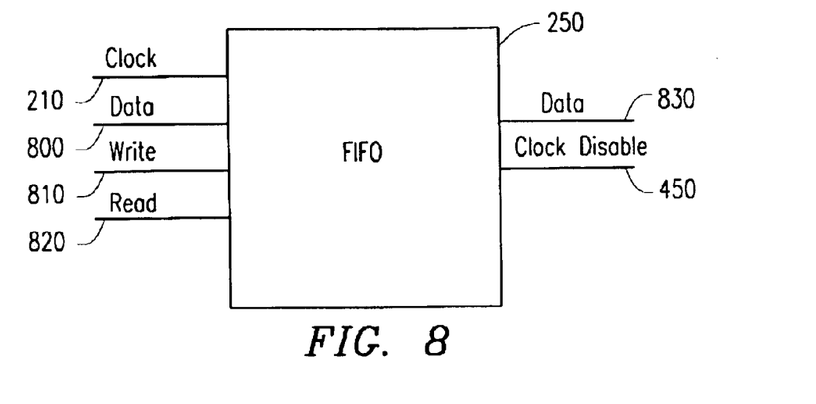
FIG. 8 illustrates an exemplary type of functional block for generating a clock disable signal based on the values of input signals.

Any mechanism can be used by the clock disable logic 420 to determine when to gate the clock signal 210. For example, FIG. 8 illustrates an exemplary type of functional block 250 for generating a clock disable signal 450 based on the current state of the functional block 250 and the values of input signals to the functional block 250. The functional block in FIG. 8 is an idle-detecting first-in-first-out (FIFO) buffer that reads data at its input and writes data at its output. The FIFO 250 has inputs for receiving a clock signal 210, data 800, a write signal 810 and a read signal 820. The FIFO 250 further has outputs for writing data 800 and generating a clock disable signal 450. The values of the read and write signals 810 and 820, respectively, are used by the FIFO 250 to determine whether the FIFO 250 is in an idle state that justifies the generation of the clock disable signal 450.

Figure 9:
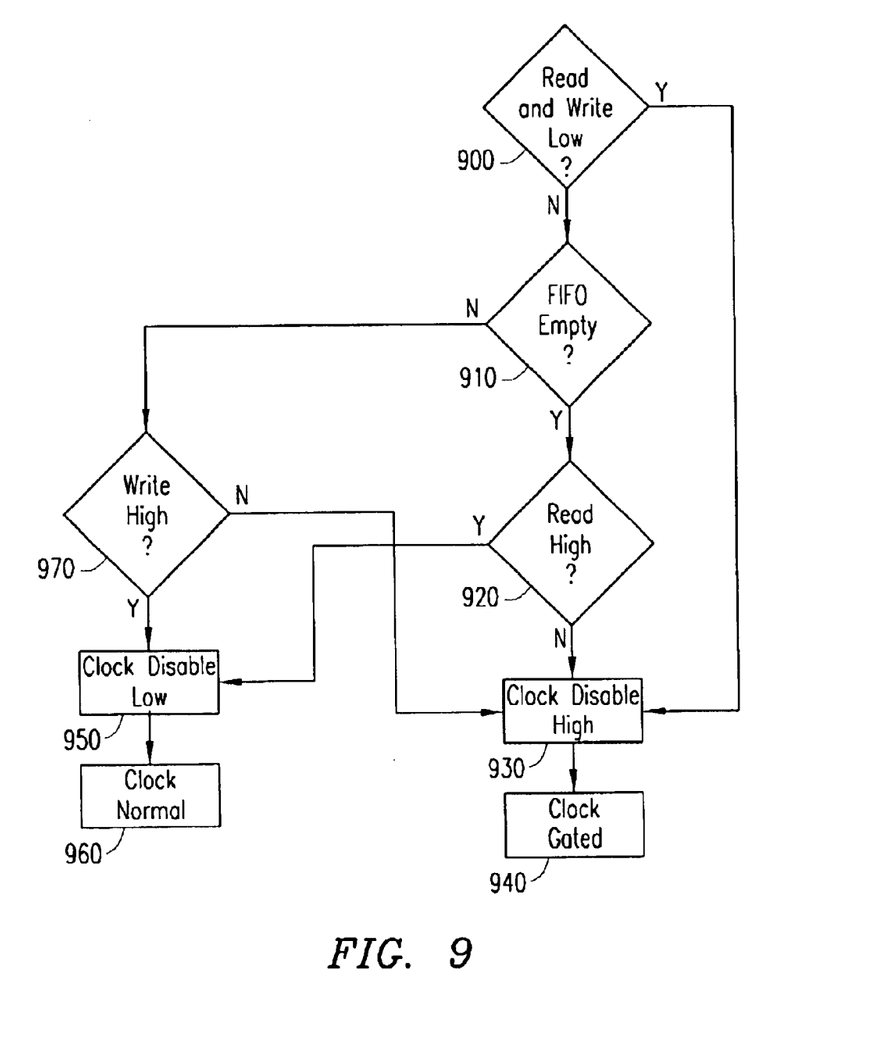
FIG. 9 is a flow chart illustrating an exemplary process for determining the value of the clock disable signal generated by the functional block of FIG. 8.

An exemplary process for the FIFO of FIG. 8 to determine the value of the clock disable signal is shown in FIG. 9. If the read and write input signals to the FIFO are both low (block 900) indicating that there is no data to be processed during the next operating state (or clock cycle), the logic level of the clock disable signal from the FIFO goes high (block 930) to gate the clock signal to the FIFO (block 940). However, if one of the read or write input signals is high (block 900), and the FIFO is currently empty (block 910), e.g., no data is stored in the FIFO, the FIFO determines the logic level of the read input signal (block 920). If the read input signal is low indicating that there is no data available to be read during the next clock cycle, the logic level of the clock disable signal from the FIFO goes high (block 930) to gate the clock signal to the FIFO (block 940). Otherwise, the logic level of the clock disable signal from the FIFO goes low (block 950) to clock the FIFO during the next clock cycle (block 960).

If one of the read or write input signals is high (block 900), and the FIFO is currently storing data (block 910), the FIFO determines the logic level of the write input signal (block 970). If the write input signal is low indicating that no data will be output during the next clock cycle, the logic level of the clock disable signal from the FIFO goes high (block 930) to gate the clock signal to the FIFO (block 940). Otherwise, the logic level of the clock disable signal from the FIFO goes low (block 950) to clock the FIFO during the next clock cycle (block 960).

Figure 5:
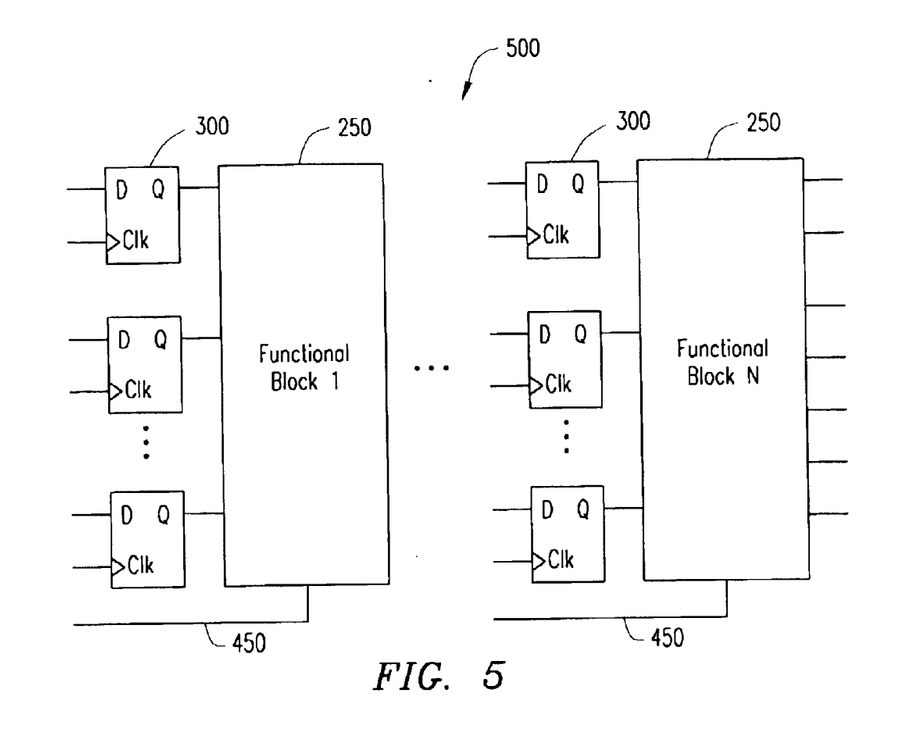
FIG. 5 illustrates a chip having multiple functional blocks arranged in a pipeline design.

In further embodiments, as shown in FIG. 5, the digital circuit can be a pipeline circuit 500 having multiple functional blocks 250 interconnected in a pipeline design. Each functional block 250 generates a respective clock disable signal 450 to gate the clock signal to the flip-flops 300 of each functional block 250 independently of the other functional blocks 250 within the pipeline circuit 500. Each functional block 250 in the pipeline circuit 500 receives notification, through handshake signals with adjacent functional blocks 250 within the pipeline circuit 500, of whether there is data available for the functional block 250 to process. If data is not available, the functional block 250 generates the clock disable signal 450 for that functional block 250. However, if data is available, the functional block 250 deactivates the clock disable signal to receive a clock signal to process the data.

By gating individual functional blocks 250 and not the entire pipeline 500, activity in one functional block 250 does not require all functional blocks 250 to be clocked. Therefore, power consumption savings can be achieved when only a small portion of the pipeline 500 is idle. For example, in a video processing application, data is typically being processed by some functional block 250 in the pipeline 500. A system that only gates power at the global pipeline level would not be able to reduce power consumption when any one of the functional blocks 250 is non-idle. However, clock gating at the individual functional blocks 250 can save power by dynamically clock gating the individual idle functional blocks 250.

Figure 6A:
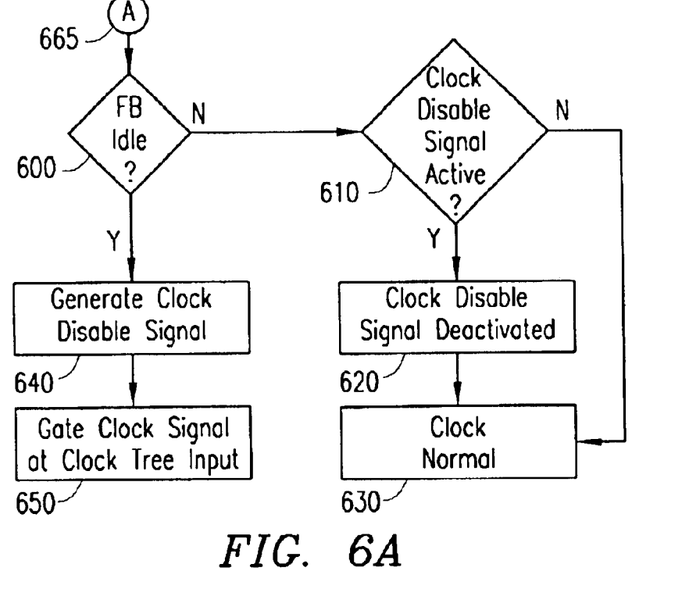
FIG. 6A is a flow chart illustrating an exemplary process for gating a clock signal to a functional block.

FIG. 6A is a flow chart illustrating an exemplary process for gating a clock signal to a functional block. The process begins at block 665. If a functional block determines that the next operating state of the functional block is a non-idle state (block 600), and the clock disable signal is currently active (block 610), the functional block deactivates the clock disable signal (block 620) to enable the functional block to receive the clock signal (block 630). However, if the functional block determines that the next operating state of the functional block is an idle state (block 600), the functional block generates the clock disable signal (block 640) to gate the clock signal to the functional block at the clock tree node corresponding to the functional block (block 650).

Figure 6B:
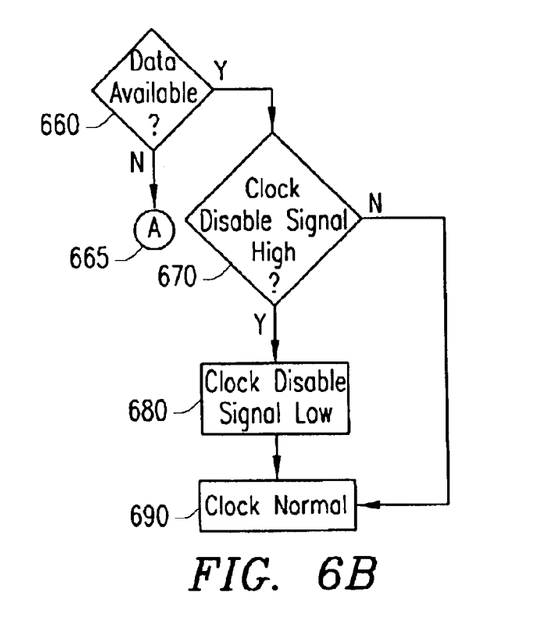
FIG. 6B is a flow chart illustrating an exemplary process for a functional block to generate a clock disable signal to gate the clock to the functional block.

FIG. 6B is a flow chart illustrating an exemplary process for a functional block to generate a clock disable signal to gate the clock to the functional block. If the functional block determines that there is currently no data available for the functional block to process (block 660), the functional block performs the process shown in FIG. 6A to gate the clock signal to the functional block (block 665). However, if there is data available, and the clock disable signal is at a high logic level indicating that the clock disable signal is active (block 670), the functional block deactivates the clock disable signal by switching the logic level from high to low (block 680) so that the functional block can receive the clock signal and process the data (block 690).

Figure 7:
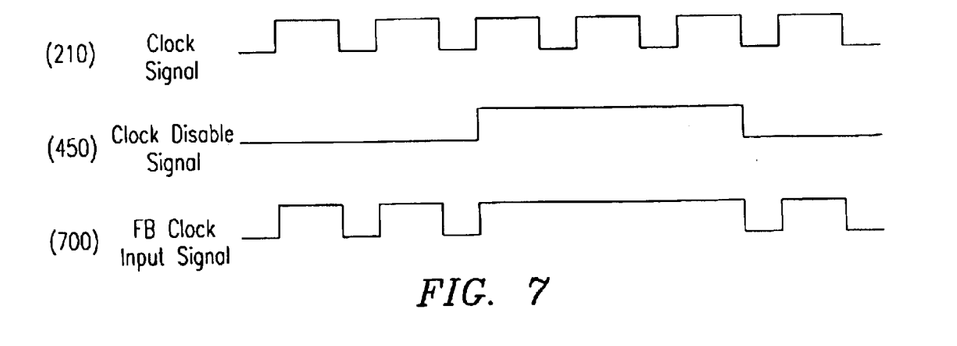
FIG. 7 is a clock timing diagram illustrating exemplary logic levels of the clock signals input to and output of the clock gating circuit of FIG. 4.

FIG. 7 is a clock timing diagram illustrating exemplary logic levels of the clock signal input to the clock gating circuit of FIG. 4. The circuit clock signal is shown in the top row. Immediately below the circuit clock signal, the clock disable signal 450 is illustrated. A clock input signal 700 to the functional block is shown below the clock disable signal 450. As can be seen in FIG. 7, when the logic level of the clock disable signal 450 goes high, the clock signal 210 is gated so that the clock input signal 700 (i.e., gated clock signal) to the functional block maintains its current value to prevent switching in both the clock tree to the functional block and the external and internal flip-flops of the functional block.

Figure 10:
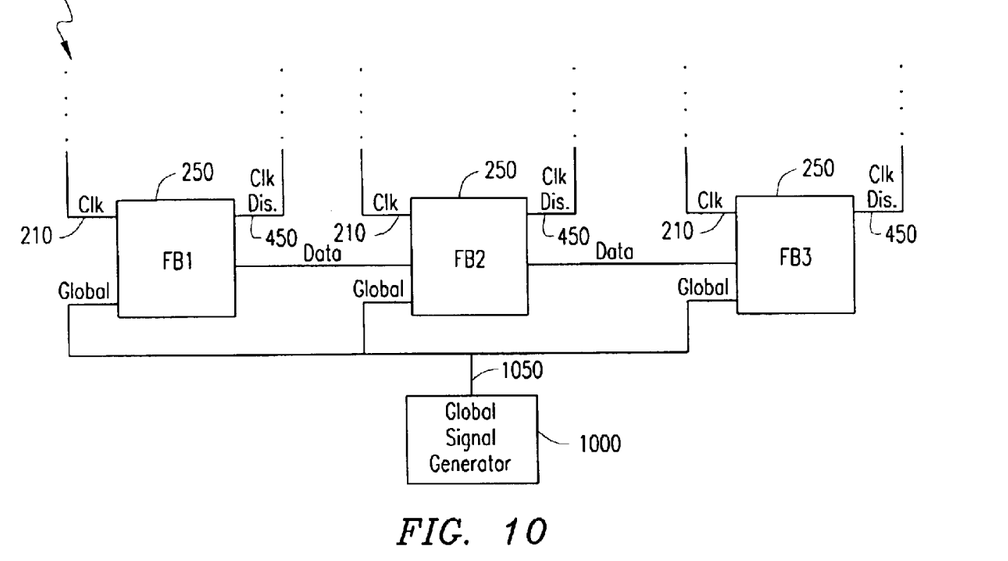
FIG. 10 is a block diagram of a digital circuit for providing a global signal to each functional block to prevent the generation of respective clock disable signals.

Although reduced switching in the clock tree reduces the power dissipation in digital circuits, there may be situations where gating the clock signal is undesirable. For example, clock gating is inconvenient during testing of the digital circuit, as multiple test runs may be required to adequately test all functional blocks and clock tree elements of the digital circuit. Therefore, in further embodiments, as shown in FIG. 10, the digital circuit 500 can include a global signal generator 1000 for providing a global signal 1050 to each of the functional blocks 250 to prevent the generation of respective clock disable signals 450, when necessary. The global signal generator 1000 is connected to each of the functional blocks 250 within the digital circuit 500. FIG. 10 illustrates a pipeline design, where functional blocks 250 FB1, FB2 and FB3 are serially connected. However, it should be understood that the concepts shown in FIG. 10 can be modified to any digital circuit design.

To prevent each functional block 250 from generating a respective clock disable signal 450, the global signal generator 1000 provides the global signal 1050 to each of the functional blocks 250 at an input thereto. The global signal 1050 is input to the clock disable logic (shown in FIG. 4) within each of the functional blocks 250 to deactivate the respective clock disable signals 450. Each functional block 250 is clocked by the clock signal 210 during the time that the global signal 1050 is active, regardless of whether any of the functional blocks 250 is idle.

Figure 11:
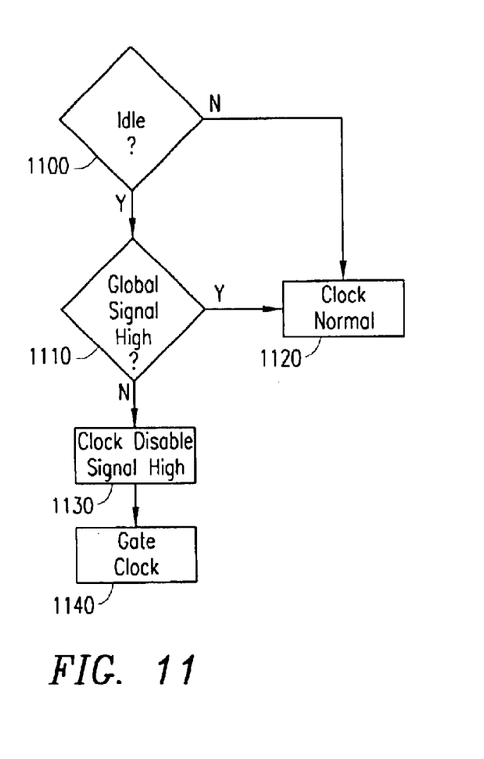
FIG. 11 is a flow chart illustrating an exemplary process for applying a global signal to prevent generation of a clock disable signal.

FIG. 11 is a flow chart illustrating an exemplary process for applying a global signal to prevent generation of a clock disable signal at a particular one of the functional blocks within a digital circuit. If a functional block determines that the next operating state of the functional block is a non-idle state (block 1100), the functional block continues to receive the clock signal, as normal (block 1120). Likewise, if the functional block determines that the next operating state of the functional block is an idle state (block 1100), and the logic state of the global signal is high (block 1110) indicating that the clock should not be gated to the functional block, the functional block does not generate the clock disable signal and continues to receive the clock signal, as normal (block 1120).

However, if the functional block determines that the next operating state of the functional block is an idle state (block 1100), and the logic state of the global signal is low (block 1110) indicating that there are no limitations on clock gating, the functional block generates the clock disable signal (block 1130), e.g., switches the logic state of the clock disable signal to high, to gate the clock signal to the functional block at the clock tree input to the functional block (block 1140).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A clock gating circuit in a logic device including at least one functional block, the clock gating circuit comprising:
    a logic gate coupled to receive an input clock signal and a clock disable signal and operable to selectively provide a gated clock signal to the functional block; and
    a clock tree circuit coupled between the logic gate and the functional block, said clock tree circuit comprising at least one delay element to control the timing of the clock signal provided to the functional block.

2. The clock gating circuit of claim 1, wherein said logic gate is configured to provide the gated clock signal to the functional block when a logic state of the clock disable signal indicates that a next operating of the functional block is an idle state.

3. The clock gating circuit of claim 1, further comprising:
    at least one external flip-flop coupled between the at least one delay element and the functional block, said at least one external flip-flop being connected to receive the gated clock signal.

4. The clock gating circuit of claim 3, wherein the functional block comprises at least one internal flip-flop connected to receive the gated clock signal.

5. The clock gating circuit of claim 1, wherein said logic gate is further configured to provide the clock signal to the functional block when a logic state of the clock disable signal indicates that a next operating of the functional block is a non-idle state.

6. A digital circuit, comprising:
    a functional block configured to generate a clock disable signal therefor;
    a clock tree circuit comprising a node corresponding to said functional block, said clock tree circuit further comprising at least one delay element coupled between the node and said functional block to control the timing of a clock signal provided to said functional block; and
    a logic gate interposed between the node and the at least one delay element, said logic gate further coupled to receive the clock disable signal and provide a gated clock signal to said functional block.

7. The digital circuit of claim 6, wherein said functional block is further configured to generate the clock disable signal when a next operating of said functional block is an idle state.

8. The digital circuit of claim 7, wherein said functional block is connected to receive at least one input signal indicating whether the next operating state of said functional block is an idle state or a non-idle state.

9. The digital circuit of claim 7, wherein said digital circuit is a pipeline circuit comprising a plurality of serially connected functional blocks, each of said serially connected functional blocks being separately clocked by the clock signal and each of said serially connected functional blocks separately generating a respective clock disable signal to provide a respective gated clock signal to respective ones of said serially connected functional blocks within said pipeline circuit.

10. The digital circuit of claim 9, wherein each of said serially connected functional blocks comprises at least one clocked flip-flop coupled to a combinational logic circuit.

11. The digital circuit of claim 9, wherein each of said serially connected functional blocks are connected to transmit and receive handshake signals between adjacent ones of said serially connected functional blocks, the handshake signals indicating whether the next operating state of each of said serially connected functional block is an idle state or a non-idle state.

12. The digital circuit of claim 6, further comprising:
    at least one external flip-flop coupled between the at least one delay element and the functional block, said at least one external flip-flop being connected to receive the gated clock signal.

13. The digital circuit of claim 12, wherein said functional block comprises at least one internal flip-flop coupled to a combinational logic circuit, the at least one internal flip-flop being connected to receive the gated clock signal.

14. The digital circuit of claim 6, wherein said functional block is further configured to deactivate the clock disable signal when a next operating of said functional block is a non-idle state, the clock signal being provided to said functional block when the clock disable signal is deactivated.

15. The digital circuit of claim 6, further comprising:
    a global signal generator connected to provide a global signal to said functional block, the global signal preventing the generation of the clock disable signal by said functional block.

16. The digital circuit of claim 6, wherein said functional block uses a flip-flop to generate the clock disable signal.

17. A method for gating clock signals within a digital circuit to reduce power consumption of the digital circuit, the method comprising:
    receiving a clock signal for a functional block at a node of a clock tree circuit corresponding to the functional block;
    receiving a clock disable signal generated by the functional block; and gating the clock signal to the functional block at the node of the clock tree circuit upon receipt of the clock disable signal.

18. The method of claim 17, wherein said receiving the clock disable signal further comprises:

receiving the clock disable signal when a next operating of the functional block is an idle state.

19. The method of claim 18, wherein said receiving the clock disable signal further comprises:

determining a current operating state of the functional block;

determining a value of at least one input signal to the functional block; and receiving the clock disable signal when the current operating state is an idle state and the value of the at least one input signal indicates that the next operating state is an idle state.

20. The method of claim 17, further comprising:

ungating the clock signal to the functional block when the clock disable signal is deactivated indicating a next operating of said functional block is a non-idle state.

21. The method of claim 17, further comprising:

preventing the generation of the clock disable signal by said functional block.

* * * * *